US012656261B2

(12) United States Patent
Kao et al.

(10) Patent No.: US 12,656,261 B2
(45) Date of Patent: Jun. 16, 2026

(54) SYSTEM AND METHOD FOR MONITORING AND CONTROLLING MULTI-PHASE CONDITION OF REACTANTS IN MANUFACTURING PROCESS

(71) Applicant: INDUSTRIAL TECHNOLOGY RESEARCH INSTITUTE, Hsinchu (TW)

(72) Inventors: Feng-Sheng Kao, Hsinchu City (TW); Tzu-Yu Liu, Zhubei City (TW); Cheng-Hsuan Lin, Zhudong Township (TW); Chih-Ying Yen, Kaohsiung City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 953 days.

(21) Appl. No.: 17/853,351

(22) Filed: Jun. 29, 2022

(65) Prior Publication Data

US 2023/0136503 A1     May 4, 2023

(30) Foreign Application Priority Data

Nov. 3, 2021    (TW) ................................. 110140949

(51) Int. Cl.
| | |
|---|---|
| *G06K 9/00* | (2022.01) |
| *G01N 21/17* | (2006.01) |
| *G01N 21/75* | (2006.01) |

(52) U.S. Cl.
CPC ............. *G01N 21/75* (2013.01); *G01N 21/17* (2013.01); *G01N 2021/177* (2013.01)

(58) Field of Classification Search
CPC ... G01N 21/75; G01N 21/17; G01N 2021/177
See application file for complete search history.

(56) References Cited

U.S. PATENT DOCUMENTS

| | | | | |
|---|---|---|---|---|
| 4,687,338 A | * | 8/1987 | Task ........................ | G01N 21/47 |
| | | | | 356/239.1 |
| 7,887,752 B2 | * | 2/2011 | Heiner ................. | B01J 19/0046 |
| | | | | 422/68.1 |

(Continued)

FOREIGN PATENT DOCUMENTS

| | | |
|---|---|---|
| CN | 105141932 A | 12/2015 |
| CN | 105004647 B | 7/2019 |

(Continued)

OTHER PUBLICATIONS

Japanese Office Action for Japanese Application No. 2022-104827, dated Jun. 27, 2023, with an English translation.

(Continued)

*Primary Examiner* — Avinash Yentrapati
(74) *Attorney, Agent, or Firm* — Birch, Stewart, Kolasch & Birch, LLP

(57) ABSTRACT

A method for monitoring and controlling multi-phase condition of reactant in manufacturing process is provided. The monitoring and controlling method includes the following steps. A plurality of clusters of monitoring images is captured corresponding to a plurality of process reaction time points in a plurality of observation regions. According to the clusters of the monitoring images, a plurality of image index features is extracted. According to the image index features, a plurality of phase modes corresponding to the observation regions is determined. According to the image index features, a cluster of generation characteristics of the reactant corresponding to the phase modes is determined. According to the cluster of generation characteristics, an adjustment of the manufacturing process is performed.

9 Claims, 9 Drawing Sheets

100

(56)  References Cited

U.S. PATENT DOCUMENTS

| | | | | |
|---|---|---|---|---|
| 8,184,294 | B2 * | 5/2012 | Shakespeare | .......... G01N 21/47 |
| | | | | 382/141 |
| 9,423,346 | B2 | 8/2016 | Xu | |
| 2009/0116019 | A1 | 5/2009 | Stoddard et al. | |
| 2009/0161101 | A1 * | 6/2009 | Tuschel | .................... G01J 3/44 |
| | | | | 356/300 |
| 2013/0078150 | A1 * | 3/2013 | Obata | .................... G01N 21/75 |
| | | | | 422/82.05 |
| 2022/0207696 | A1 * | 6/2022 | Jain | ........................... G06T 7/90 |
| 2022/0349738 | A1 * | 11/2022 | Meribout | ................ G01B 7/06 |

FOREIGN PATENT DOCUMENTS

| | | | |
|---|---|---|---|
| CN | 110073301 | A | 7/2019 |
| EP | 2 579 020 | B1 | 12/2018 |
| JP | 2010-508534 | A | 3/2010 |
| JP | 2011-69682 | A | 4/2011 |
| JP | 2013-64633 | A | 4/2013 |
| JP | 2015-528911 | A | 10/2015 |
| TW | 201107409 | A1 | 3/2011 |
| TW | 201733730 | A | 10/2017 |
| WO | WO 2020/030947 | A1 | 2/2020 |

OTHER PUBLICATIONS

McDonald et al., "Reactive crystallization: a review", Reaction
Chemistry & Engineering, 2021, vol. 6, pp. 364-400.
Taiwanese Office Action and Search Report for Taiwanese Application No. 110140949, dated Nov. 4, 2022.

* cited by examiner

110

SYSTEM AND METHOD FOR MONITORING AND CONTROLLING MULTI-PHASE CONDITION OF REACTANTS IN MANUFACTURING PROCESS

This application claims the benefit of Taiwan application Serial No. 110140949, filed Nov. 3, 2021, the disclosure of which is incorporated by reference herein in its entirety.

TECHNICAL FIELD

The disclosure relates in general to a monitoring system and method thereof, and more particularly to a system and a method for monitoring and controlling a multi-phase condition of reactants in manufacturing process.

BACKGROUND

Generally speaking, the crystallization condition control of reactants is an important procedure in a manufacturing process, the current process performed by on-site monitoring personnel is to extract samples in a tank through an invasive device or to watch through the glass window, and speculate the crystallization condition of the reactants based on the personnel's experience, so as to facilitate the on-site monitoring personnel to adjust the reactants to the best crystallization condition. Since the control of the manufacturing process depends upon the personnel's experience, the human factor has a decisive influence on the quality of a finished product of the reactants, so the quality of the finished product is not well.

Therefore, it is necessary to overcome the technical bottleneck existing in the monitoring and controlling process of the reactants to avoid human factors affecting the quality of the reactants.

SUMMARY

The disclosure is directed to a system and a method for monitoring and controlling multi-phase condition of reactants in a manufacturing process, which are configured to establish a computer vision image processing and a real-time analysis of the reactants to realize an online automatic control.

According to one embodiment, a system for monitoring and controlling multi-phase condition of reactants is provided, which is configured to monitor and control a phase condition of the reactants in a manufacturing process. The system includes a monitoring device, an image processing module, a phase condition analysis module, a feature analysis module and a regulation module. The monitoring device is configured for capturing a plurality of clusters of monitoring images corresponding to a plurality of process reaction time points in a plurality of observation regions. The image processing module is configured for receiving the clusters of monitoring images, and extracting a plurality of image index features from the clusters of monitoring images. The phase condition analysis module is configured for determining a plurality of phase condition modes corresponding to the observation regions according to the image index features. The feature analysis module is configured for determining a cluster of generation characteristics of the reactants corresponding to the phase modes according to the image index features. The regulation module is configured to perform an adjustment of the manufacturing process according to the cluster of generation characteristics.

According to another embodiment, a method for monitoring and controlling multi-phase condition of reactant in manufacturing process is provided. The monitoring and controlling method includes the following steps. A plurality of clusters of monitoring images is captured corresponding to a plurality of process reaction time points in a plurality of observation regions. According to the clusters of the monitoring images, a plurality of image index features is extracted. According to the image index features, a plurality of phase modes corresponding to the observation regions is determined. According to the image index features, a cluster of generation characteristics of the reactant corresponding to the phase modes is determined. According to the cluster of generation characteristics, an adjustment of the manufacturing process is performed.

Figure 1:
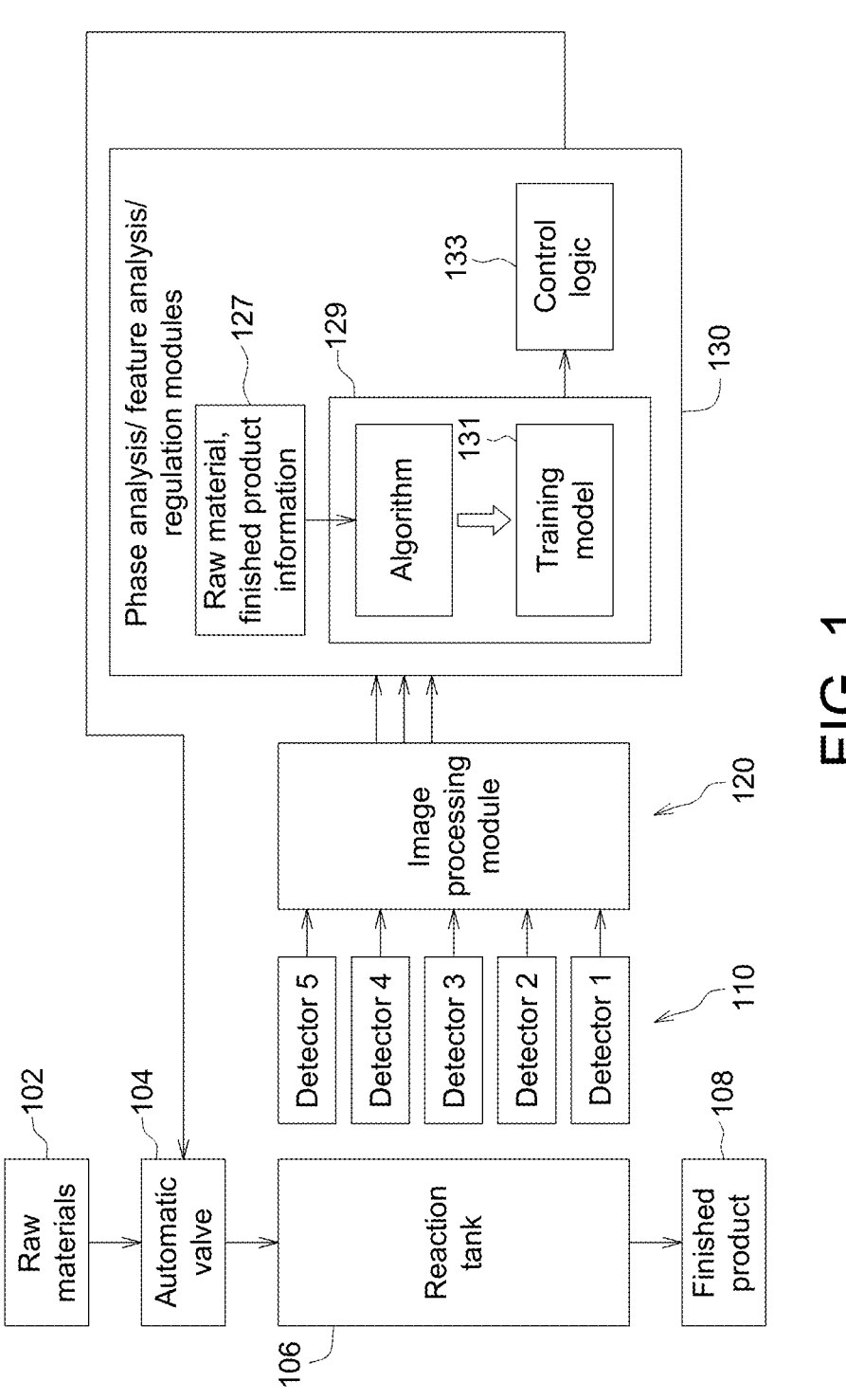
FIG. 1 is a schematic diagram of a system for monitoring and controlling the multi-phase condition of reactants according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The technical features in the embodiments of the present disclosure will be clearly and completely described below in conjunction with the accompanying drawings in the embodiments of the present disclosure. Obviously, the described embodiments are just a part of the embodiments of the present disclosure, rather than all the embodiments.

Furthermore, the described features, structures, or characteristics may be combined in any suitable manner in one or more embodiments. In the following description, numerous specific details are provided in order to give a thorough understanding of the embodiments of the present disclosure. However, those skilled in the art will appreciate that the technical solutions of the present disclosure may be practiced without one or more of the specific details, or other methods, compositions, devices, steps, etc. may be employed. In other instances, well-known methods, devices, implementations, or operations have not been shown or described in detail to avoid obscuring aspects of the present disclosure.

As shown in the accompanying drawings of this disclosure, the system 100 for monitoring and controlling the multi-phase condition of reactants in the present embodiment can be implemented through computer vision, to replace the on-site monitoring personnel to judge the current reaction condition with human eyes and their experiences, reducing artificial misjudgment. In addition, the system 100 for monitoring and controlling the condition of reactants in this embodiment uses the monitoring device 110 to capture a plurality of images in different observation regions, and conducts phase condition analysis and generation characteristic analysis through a plurality of clusters of monitoring images in different observation regions, so that the generation characteristics of the reactants in different phase conditions can be obtained to improve the discrimination of feature size. At the same time, the regulation module 136 of the present embodiment can continuously control the manufacturing process parameters of the reactants according to the plurality of image index features generated by the image processing module 120 and the generation characteristics of the reactants corresponding to different phase conditions in order to achieve the purpose of continuous process monitoring and control.

Figure 2:
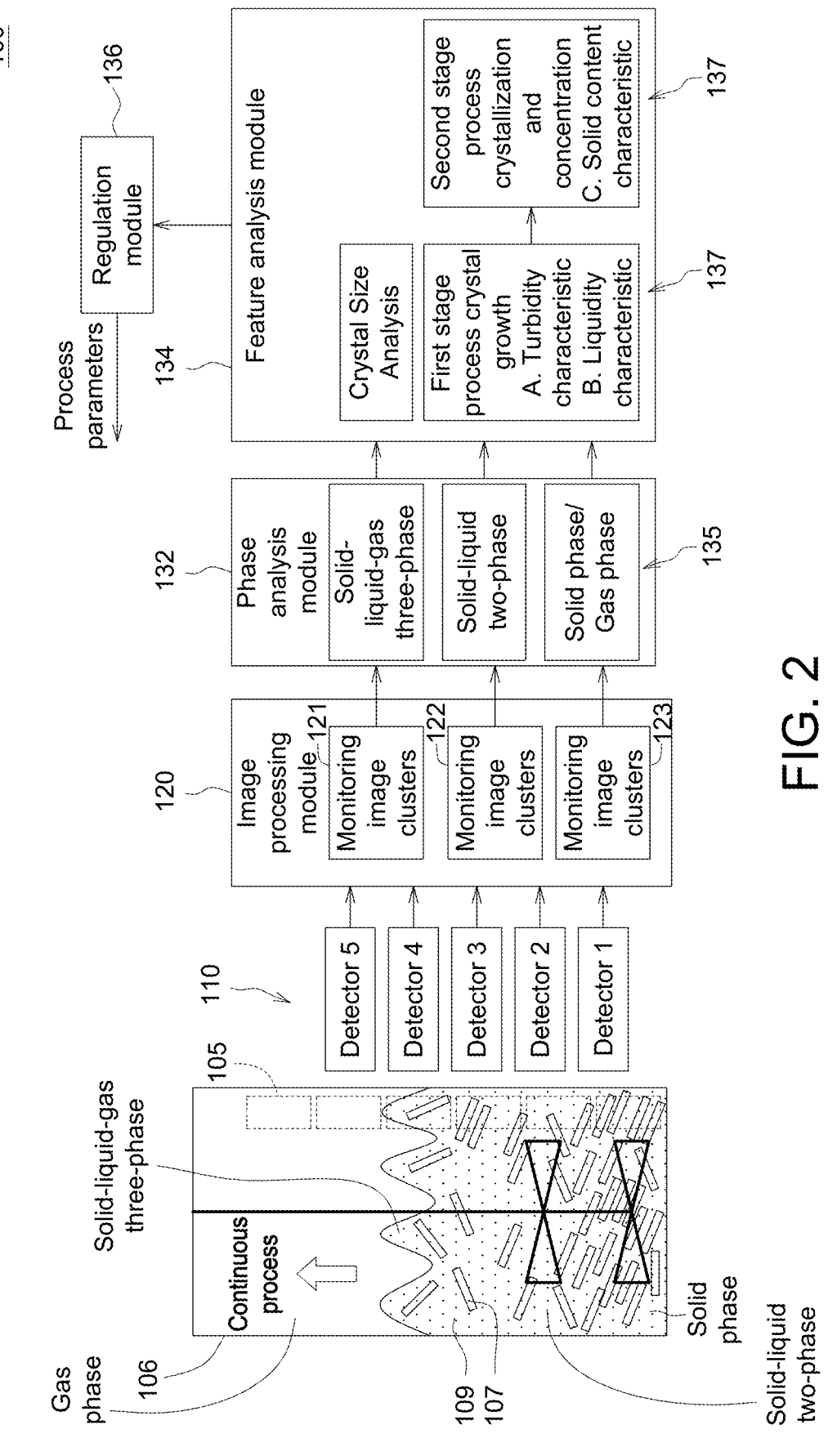
FIG. 2 is a detailed schematic diagram of a part of the system for monitoring and controlling the multi-phase condition of the reactants in FIG. 1 according to an embodiment of the present disclosure.

Please refer to FIG. 1 and FIG. 2, which respectively illustrate a schematic diagram of a system 100 for monitoring and controlling a multi-phase condition of reactants according to an embodiment of the present disclosure and a detailed schematic diagram thereof.

As shown in FIGS. 1 and 2, the system 100 for monitoring and controlling the multi-phase condition of the reactants is configured to monitor and control the phase change condition of the reactants in a manufacturing process. The phase change condition is, for example, a change condition of the crystallization reaction, and the crystallization reaction refers to a reactant whose phase condition in the reaction tank 106 may be solid, liquid and gas phases and the three phase conditions may coexist, or two phase conditions in which only solid and liquid coexist, or a single phase condition in which only one of solid, liquid and gas phases exist. As the reactants in different stages are generated, the solid reactants with heavier density will deposit at the bottom of the reaction tank 106, and the solid-liquid two-phase reactants can flow in the middle layer of the reaction tank 106 and are located above the solid reactants, while the solid-liquid-gas three-phase reactants contain less solid reactants, so they flow in the upper layer of the reaction tank 106 and are located above the solid-liquid two-phase reactants. As for the gaseous reactant in the uppermost layer, it is not the main product of the present disclosure, so it can be ignored. In this embodiment, reactants in different phase conditions have different characteristics. By analyzing the generation characteristics of reactants in different phase conditions, the quality of a finished product of the reactants can be controlled well.

In one embodiment, the monitoring system 100 may include a reaction tank 106, a plurality of monitoring devices 110, an image processing module 120, a phase analysis module 132, a feature analysis module 134, and a regulation module 136. In FIG. 1, the phase condition analysis module 132, the feature analysis module 134 and the regulation module 136 can be integrated into a single computing module 130 (such as a processor) or a combination of multiple independent modules. The disclosure does not limit thereto. The reaction tank 106 has at least one valve 104 for entering the raw materials 102 and water to react and these raw materials 102 are controlled under appropriate process parameters to generate reactants. Finally, the reactants can be discharged through the reaction tank 106 to become the finished products 108.

Referring to FIG. 1, the monitoring device 110 includes a plurality of detectors, such as cameras or image sensors, for capturing a plurality of monitoring images. Each detector is arranged in sequence from bottom to top and separated by a predetermined distance, and each detector is responsible for capturing the phase changes (such as phase condition and/or generation characteristics) of the reactants in different regions of the reaction tank 106 for the image processing module 120 to perform image recognition.

Referring to FIG. 2, the reaction tank 106 includes a plurality of observation regions, such as glass windows 105 or light-transmitting areas, for exposing the reactants in different areas of the reaction tank 106, for each detector aligning at each observation region and capturing phase changes of the reactants in different areas of the reaction tank 106. For example, the detector 1 in the lower layer can capture images of the solid-phase reactants deposited at the bottom of the reaction tank 106, and the detectors 2 and 3 in the middle layer can capture the images of solid-liquid two-phase reactants in the middle of the reaction tank 106, and the detector 4 located on the upper layer can capture the image of the solid-liquid-gas three-phase reactants located above the reaction tank 106. In addition, the detector 5 located on the uppermost layer can capture the image of the gaseous reactant located on the uppermost part of the reaction tank 106. The detectors 1 to 5 can simultaneously capture images or capture images in time-division multiplex, which is not limited in the present disclosure.

Although the monitoring device 110 in this embodiment takes five detectors as an example, the number and the positions of the detectors can be adjusted according to the volume of the reaction tank 106. The monitoring device 110 is configured for capturing a plurality of clusters of monitoring images corresponding to a plurality of process reaction time points in a plurality of observation regions. In addition, since each detector is responsible for continuously capturing a plurality of monitoring images, the image processing module 120 can receive these clusters of monitoring images, and extract a plurality of image index features from these clusters of monitoring images. For example, the image processing module 120 can receive a cluster of monitoring images 121 captured by the detector 4, and extract the image index features of the solid-liquid-gas three-phase reactants. In addition, the image processing module 120 can receive a cluster of monitoring images 122 and a cluster of monitoring images 123 captured by the detectors 2 and 3, and extract the image index features of the solid-liquid two-phase reactants. In addition, the reactants detected by the detector 1 and the detector 5 are single-phase, and the changes of the reactants are relatively small, so the image index features of the reactants are almost maintained constant and could not be changed with the flow of the reactants. Therefore, the image processing module 120 can receive a cluster of monitoring images of the reactants with the phase change condition, and extract the image index features (see FIGS. 6A to 6C) therefrom, for the subsequent phase condition analysis module 132 and the characteristic analysis module 134, to determine the phase modes 135 of the reactants and the corresponding cluster of generation characteristics 137.

In one embodiment, the image processing module 120 analyzes the generation characteristics of the reactants such as turbidity, fluidity, and solid content through image index features such as image brightness, image change rate, and image variation etc. Subsequently, in FIG. 2, the phase condition analysis module 132 can judge the turbidity of the reactants according to the image index features such as the image brightness of the reactant, or judge the fluidity of the reactants according to the image index features such as the image change rate and the image variation. In addition, after the phase condition analysis is completed, the feature analysis module 134 can determine the solid content generation characteristics such as the crystal size and quantity of the reactants by means of machine learning. In this embodiment, the crystals 107 are, for example, the products generated after the reactants are crystallized. The larger the number of crystals 107, the higher the solid content of the products, and the crystal-like products will be deposited at the bottom of the reaction tank 106, and since semi-products (e.g., the small crystal nuclei 108) that are not fully crystallized are small in volume and flow with the reactants, only a small part of the incompletely crystallized small crystal nuclei 108 will be deposited on the bottom of the reaction tank 106.

Referring to FIG. 1, in one embodiment, machine learning is performed, for example, through a neural network 129 and its algorithm to establish a training model 131, and the long-term monitored data (information 127 such as raw material types, feed ratio, pressure condition, temperature condition, and finished products) is used as an input end data, and the finished product feature is used as the output end data, and the correlation between the input end data and the output end data is established by machine learning to predict the result of the finished product 108.

In one embodiment, when the quality of the finished product 108 does not reach the expected result, the regulation module 136 can output a control logic 133 according to the cluster of generation characteristics of the reactants to adjust the manufacturing process. The control logic 133, for example, adjusts the manufacturing process parameters (such as the volume of water, the volume of feed, air pressure, temperature, etc.) at the input end. For example, the control logic 133 controls the automatic valve 104 of the reaction tank 106 to open or close to adjust parameters such as the volume of feed, the volume of water, air pressure, temperature etc. When the quality of the finished product 108 reaches the expected result, the manufacturing process is completed and the finished product 108 is taken out from the reaction tank 106.

The manufacturing process applicable in this embodiment is not limited to crystallization reaction, but can also be at least one chemical reaction such as concentration, dilution, polymerization, decomposition, dyeing, decolorization, etc. The image processing module 120 can use computer vision, such as image brightness, image change rate, and image variation etc., to analyze at least one chemical reaction of the reactants such as concentration, dilution, polymerization, decomposition, dyeing, decolorization, etc., and then at least one of the phase analysis module 132 and the feature analysis module 134 can automatically determine the phase mode 135 of the reactants (such as gas, liquid, solid, solid-liquid two-phase, solid-liquid-gas three-phase, etc.) and the cluster of generation characteristics 137 (such as turbidity, fluidity, and crystal size/number, etc.) thereof, so as to achieve the purpose of automatic process control and avoid the influence of human factors.

Figure 3:
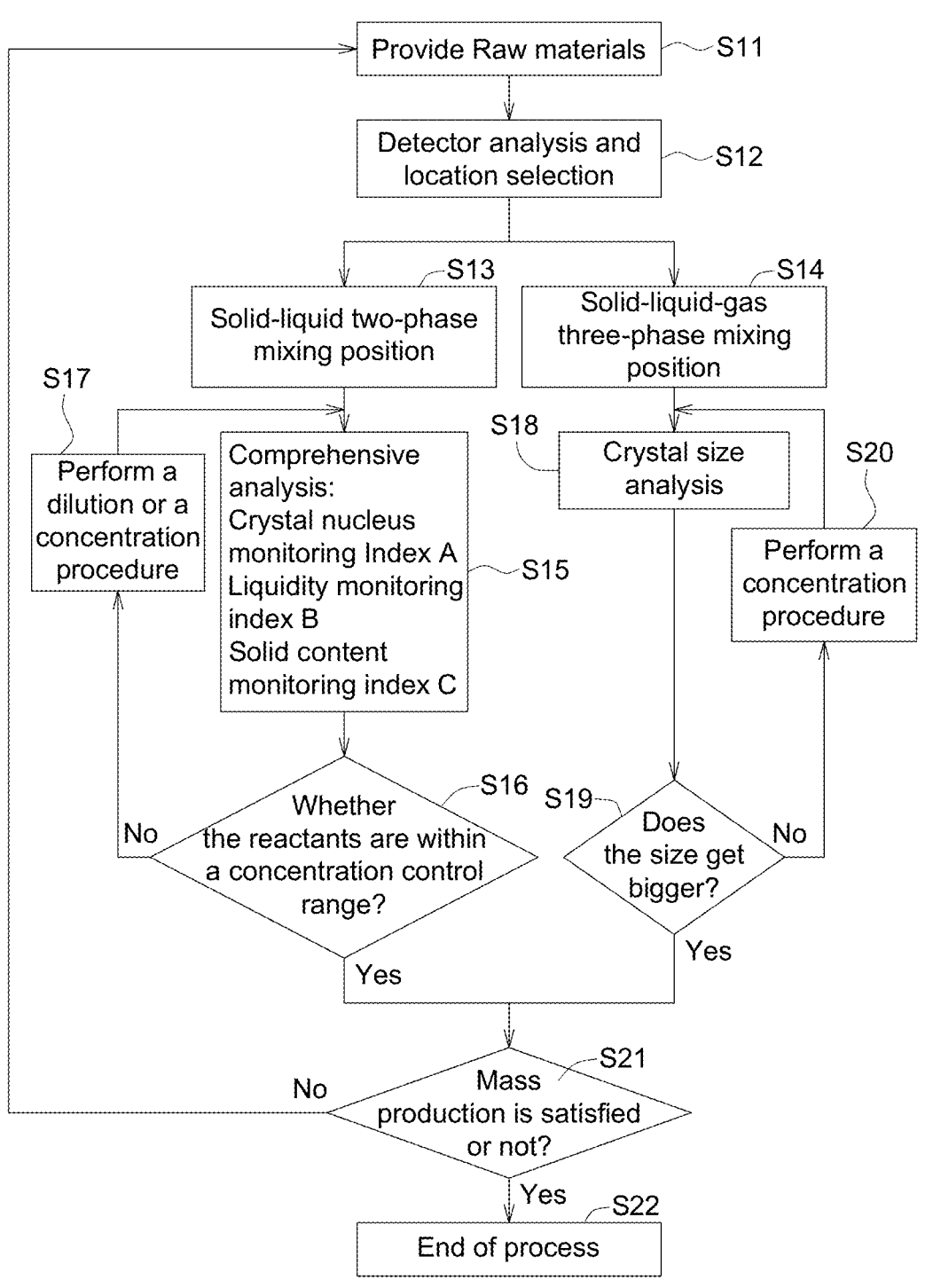
FIG. 3 is a schematic flowchart of a method for regulating the multi-phase condition of reactants according to an embodiment of the present disclosure.

In addition, referring to FIGS. 2 and 3, wherein FIG. 3 shows a schematic flowchart of a method for monitoring and controlling the multi-phase condition of reactants according to an embodiment of the present disclosure. First, the raw materials 102 are fed into the reaction tank 106 (step S11). The images of different regions is captured by multiple detectors and then location screening is performed (step S12) to obtain monitoring images of the reactants in the region to be observed (e.g., the first monitoring image 121 to the third monitoring image 123). The second and third monitoring images 122 and 123 on the solid-liquid two-phase mixing position (step S13) and the first monitoring image 121 on the solid-liquid-gas three-phase mixing position are captured (step S14), but not limited thereto. Next, the image index features of the reactants at the solid-liquid two-phase mixing position are analyzed to obtain the generation characteristics of the reactants corresponding to an observation region (step S15), and whether the reactants are within a concentration control range is determined (step S16), including the following steps: determining whether a turbidity of the reactants is lower than a crystal nucleus monitoring index A, and when the turbidity of the reactants is higher than the crystal nucleus monitoring index A, it means that the number of crystalline crystals 107 is insufficient, and it is so sticky, so that the manufacturing process carries out a dilution procedure (step S17) to reduce the turbidity of the reactants. On the contrary, when the turbidity of the reactants is lower than the crystal nucleus monitoring index A, it means that the number of crystalline crystals 107 is sufficient, and it is so crystal clear. In one embodiment, the above-mentioned crystal nucleus monitoring index A is, for example, a threshold value of the light intensity scattered after a light is projected onto the small crystal nuclei 108 generated by the reactants. When the number of small crystal nuclei 108 is larger, the reflected light intensity is stronger, and the brightness of the image captured by the photo-detector 113 is also stronger (for example, greater than the threshold value of light intensity). Therefore, the above-mentioned crystal nucleus monitoring index A can be used as a threshold for judging the image index features (such as light intensity) corresponding to the generation characteristics (such as turbidity) of the reactants.

Then, it continues to determine whether a flow of the reactants is lower than a fluidity monitoring index B, when the flow of the reactants is higher than the fluidity monitoring index B, it means that the flow rate of the crystalline crystal 107 is too high, so the manufacturing process carries out the concentration procedure (step S17) to reduce the flow of reactants. Conversely, when the flow rate of the reactants is lower than the fluidity monitoring index B, it indicates that the flow rate of the crystalline crystal 107 is too low, and the dilution procedure can be performed (step S17). In an embodiment, the above-mentioned fluidity monitoring index B is, for example, a threshold value of image change rate (such as flowing stripes, eddy currents, or light and dark changes, etc.) after a light is projected on the reactants. The faster the flow of reactants, the more evenly the image of the reflected light changes, and the variation of the average grayscale value of the entire image captured by the photo-detector 113 is smaller (for example, less than the product of the standard deviation of the average grayscale value between frames and the number of flow windows), and vice versa. When the flow of the reactants is slower, the image of the reflected light changes more unevenly, so the variation of grayscale value of the entire image captured by the photo-detector 113 is greater (for example, greater than the product of the standard deviation of the average grayscale value between frames and the number of flow windows). Therefore, the above-mentioned fluidity monitoring index B can be used as a threshold for judging an image index feature (such as the standard deviation of the average grayscale value between frames) corresponding to the generation characteristics (such as fluidity) of the reactants. The number of flow windows may be one or more, for example, three in this embodiment.

Then, it continues to judge whether a solid content of the reactants is higher than a solid content monitoring index C. When the solid content of the reactants is lower than the solid content monitoring index C, it indicates that the number of crystalline crystals 107 is too low, so the concentration process (step S17) is performed to increase the concentration of the reactant. On the contrary, when the solid content of the reactant is higher than the solid content monitoring index C, it means that a quantity of crystalline crystals 107 meets the requirement, and the subsequent discharging process can be performed. In one embodiment, the above-mentioned solid content monitoring index C is based on, for example, a standard deviation of the image pixel intensity after a light is projected onto the reactants. The higher the solid content of the reactants, the more uneven the reflection intensity of the reflected light, so the standard deviation of the intensity of each image pixel captured by the photo-detector 113 is also greater. On the contrary, when the solid content of the reactants is smaller, the reflection intensity of the reflected light is more even, so the standard deviation of the intensity of each image pixel captured by the photo-detector 113 is also smaller. Therefore, the above-mentioned solid content monitoring index C can be used as a threshold for judging an image index feature (such as pixel intensity standard deviation) corresponding to the generation characteristics (such as solid content) of the reactants.

When the quantity of crystals 107 is greater than the solid content monitoring index C, it is determined whether it meets a mass production requirements (step S21), if so, the manufacturing process is ended (step S22); if not, it returns to the step S11, and further adjust process parameters, such as controlling the feeding speed of the raw materials 102, water feeding, temperature and pressure, etc., to change the phase condition of the reactants.

Figure 5:
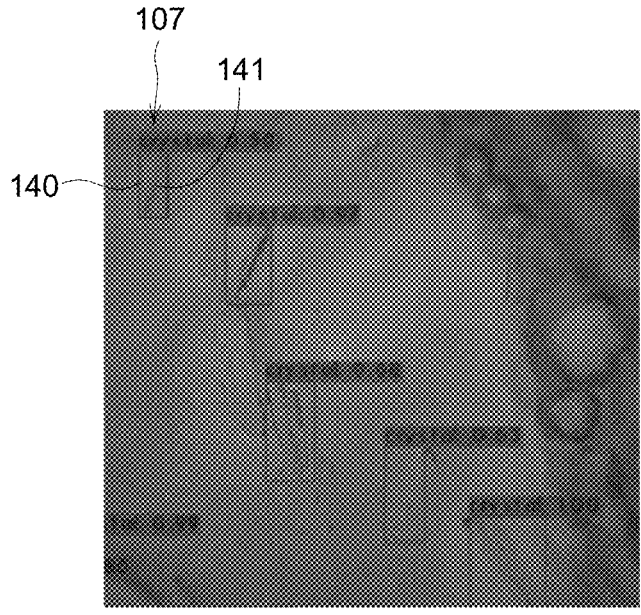
FIG. 5 and FIGS. 6A to 6C respectively show image diagrams for crystal size analysis and solid content analysis according to an embodiment of the present disclosure.

Next, referring to FIG. 3, in this embodiment, the image index features of the reactants at the solid-liquid-gas three-phase mixing position can also be analyzed to obtain a generation characteristic of the reactants corresponding to an observation region, including the following step: a crystal size of the reactants is analyzed (step S18), wherein the crystal size analysis of the reactants can use machine learning to mark different crystal sizes, positions and numbers in the monitoring images. As shown in FIG. 5, the size of the crystals 107 is the diagonal length 141 of the marked quadrilateral 140. In one embodiment, the above-mentioned monitoring images may include a mixed image of crystalline crystals, bubbles, liquids and raw materials. However, the shape of the crystalline crystals is roughly a rectangle, which is obviously different from the shapes of bubbles, liquids and raw materials in appearance. Therefore, it is easy to visually identify the phase condition of the reactants. Therefore, the feature analysis module 134 of the embodiment can determine an image index feature (e.g., the diagonal length 141 of the marked quadrilateral 140) corresponding to the generation characteristic (e.g., crystal size) of the reactants through computer vision and machine learning. Next, it is determined whether the size of the crystals 107 becomes larger (step S19). If the size of the crystals 107 does not become larger, the concentration procedure (step S20) is performed to increase the production of reactants. If the size of the crystals 107 becomes larger, it is determined whether it meets the requirements of mass production (step S21). If so, the manufacturing process ends (step S22); if not, it returns to step S11 to further adjust the parameters of the manufacturing process.

Figure 4:
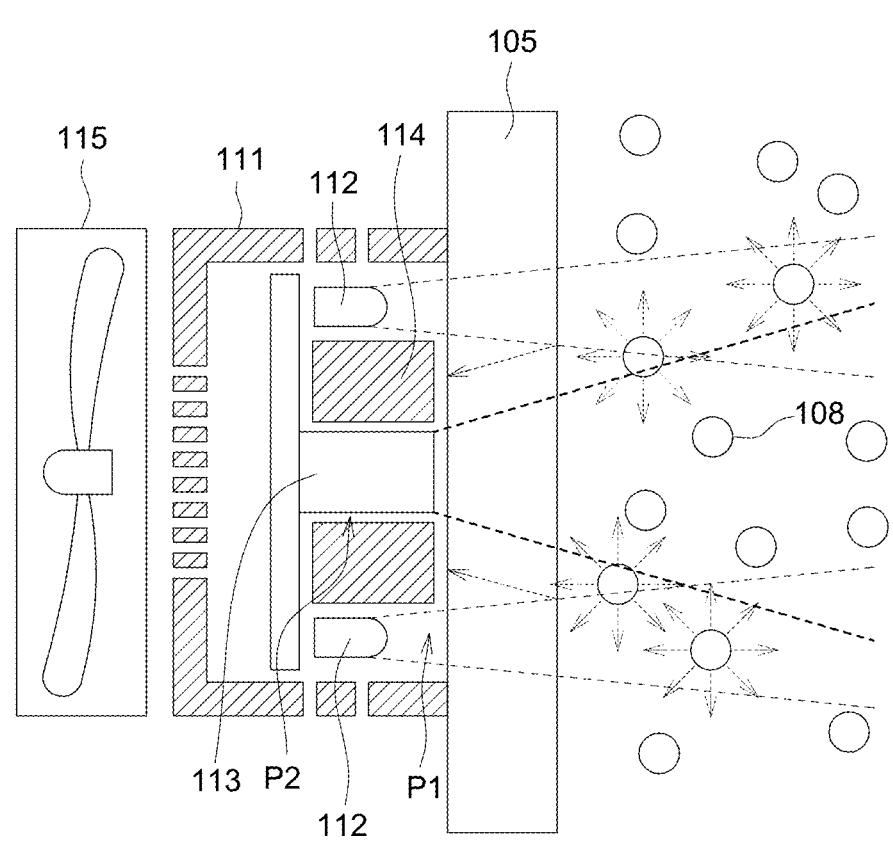
FIG. 4 is a schematic diagram of a monitoring device according to an embodiment of the present disclosure.

Referring to FIG. 4, which is a schematic diagram of the monitoring device 110 according to an embodiment of the present disclosure. The monitoring device 110 may include a casing 111, a detector 113, at least one or more light sources 112, a shielding element 114 and a cooling fan 115. The casing 111 has a first opening P1, and the detector 113, the light sources 112 and the shielding element 114 are all disposed in the first opening P1 of the casing 111, and a peripheral surface of the first opening P1 of the casing 111 is provided with a light-blocking wall surrounds the light sources 112 to avoid signal interference from the external light source. In addition, the shielding element 114 is disposed inside the first opening P1 of the casing 111 to separate the detector 113 and the light sources 112. The shielding element 114 surrounds the detector 113, so that the light projected by the light sources 112 exits through the first opening P1 between the light-blocking wall and the shielding element 114, and the shielding element 114 can prevent the light reflected from the interface (e.g., the glass window 105) from directly entering the detector 113 to avoid signal interference from the internal light sources 112. In addition, the cooling fan 115 is disposed behind the casing 111 to provide cooling airflow to the inside of the casing 111 and/or to export the heat inside the casing 111 to the outside of the casing 111 to improve the heat dissipation efficiency of the monitoring device 110 and service life of light sources 112.

In one embodiment, the shape of the casing 111 and the shielding element 114 may be circular, square, rectangular or polygonal. The light sources 112 may be a light emitting diode or the like. The detector 113 may include a short-focus optical lens.

In one embodiment, the detector 113 is disposed in a second opening P2 of the shielding element 114, and the image capturing unit of the detector 113 faces an object to be tested (such as a crystal nucleus or a reactants) inside the glass window 105, so that the reflected light can be reflected by the object and then incident into the detector 113 through the second opening P2, so as to obtain a plurality of monitoring images. In one embodiment, the detector 113 is an optical lens of a two-dimensional image array, the resolution of the detector 113 is high, the light sources 112 are stable, and is not easily affected by the external environment, and the detector 113 can detect the reactants from the outside of the reaction tank 106 in real time, and transmits the image data of the reactants to the image processing module 120 at the back end for analysis, so as to avoid the error of human judgment from affecting the quality of the finished product 108.

Figure 6:
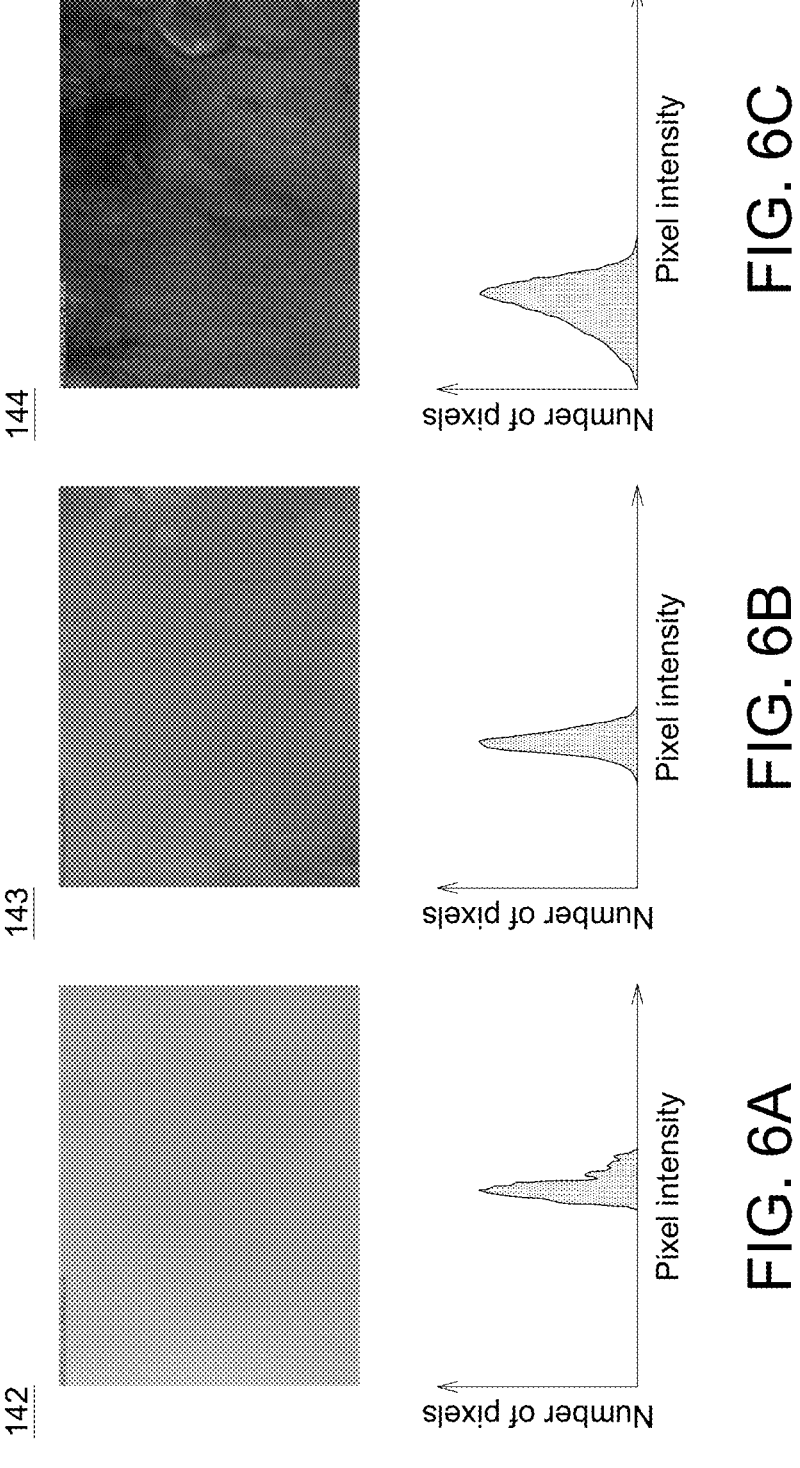

Referring to FIGS. 5, 6A, 6B, and 6C, which are respectively image diagrams for crystal size analysis and solid content analysis according to an embodiment of the present disclosure. In FIG. 5, in this embodiment, for example, a labeling software is configured to frame the crystal positions in a plurality of monitoring images, and software such as TensorFlow is configured to learn the labeling position features. After the learning mode is completed, real-time identification of the actual monitoring images can be performed to obtain the crystal size of the reactants. The size of the crystals 107 is, for example, the diagonal length 141 of the quadrilateral 140. In addition, FIGS. 6A, 6B and 6C are respectively schematic diagrams of three phase modes of the reactants and their image index features. The solid content analysis method of this embodiment, for example, analyzes the standard deviation of pixel grayscale values in a single image, as shown in FIG. 6A. The monitoring image 142 of the solid reactants with a high solid content and a low fluidity has a uniform distribution of pixel grayscale values, so a highest average grayscale value and a smallest standard deviation of the grayscale value could be obtained. Secondly, as shown in FIG. 6B, the solid-liquid two-phase reactants has a second-highest solid content and a high fluidity. Compared with the former monitoring image 142, the pixel grayscale value distribution of the monitoring image 143 is less uniform, so a second-highest average grayscale value and a second-smallest standard deviation of the grayscale value could be obtained. Furthermore, as shown in FIG. 6C, the monitoring image 144 of the solid-liquid-gas three-phase reactants has a more lower solid content and a more higher fluidity. Compared with the two former monitoring images 142 and 143, the monitoring image 144 has a more uneven pixel grayscale value distribution than the former two, so a lowest average grayscale value and a highest standard deviation of the grayscale value could be obtained.

Figure 7:
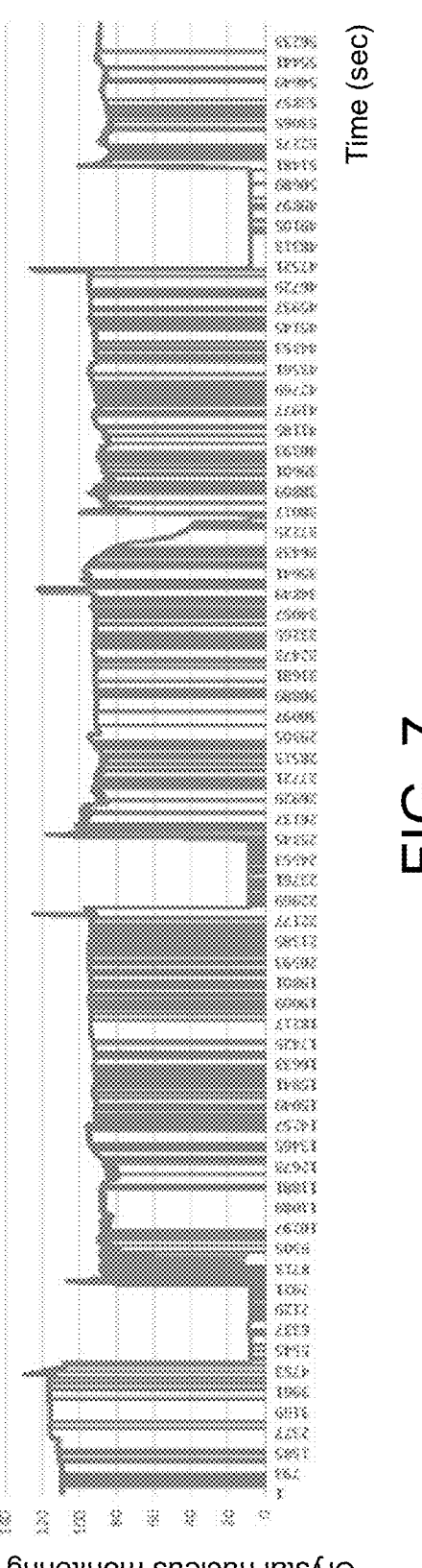
FIGS. 7 to 9 respectively show schematic diagrams of long-term monitoring data of the multi-phase condition of the reactants according to an embodiment of the present disclosure.
Figure 8:
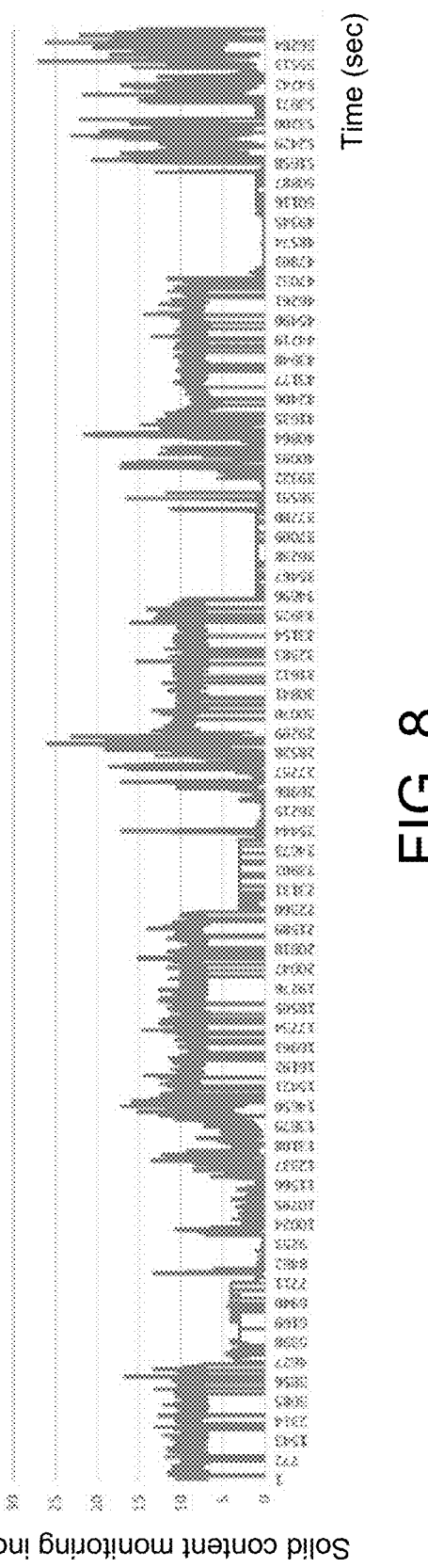
Figure 9:
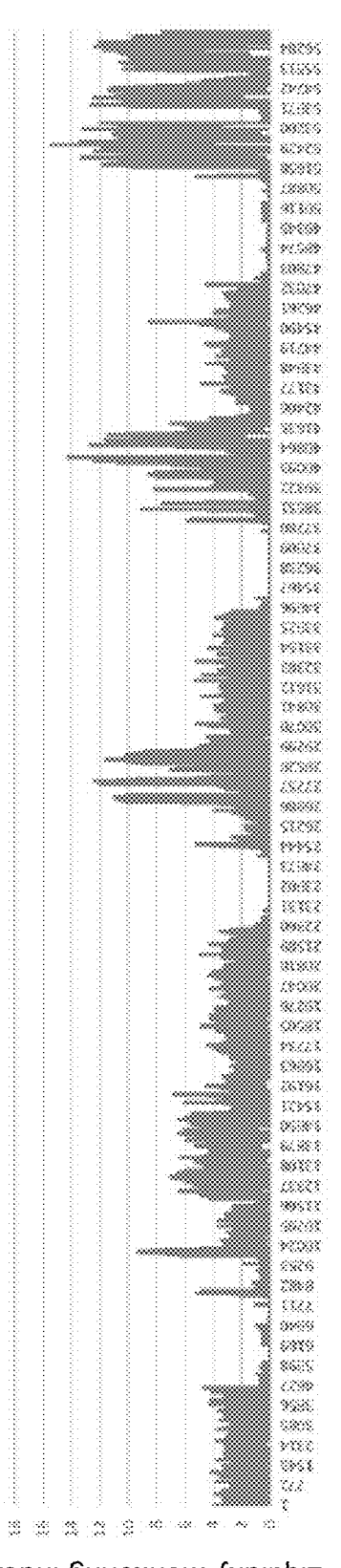

Please refer to FIGS. 7 to 9, which are respectively schematic diagrams of long-term monitoring data of reactant conditions according to an embodiment of the present disclosure, wherein FIG. 7 is a data diagram of a crystal nucleus monitoring index configured for turbidity analysis, FIG. 8 is a data diagram of a solid content monitoring index configured for solid content analysis, and FIG. 9 is a data diagram of a fluidity monitoring index configured for flow analysis. In FIG. 7, when a turbidity analysis is performed, due to the Tyndall effect, the small nuclei 108 generated by the reactants will cause the light being scattered to change the gray scale value of the image. Therefore, the crystal nucleus monitoring index can be used to determine the turbidity of the reactants (as shown in step S15 in FIG. 3). In addition, in FIG. 8, when a solid content analysis is performed, each of intensities (or grayscale values) of pixels in a single image obtained by the detector is different, so the solid content of the reactants can be determined by the solid content monitoring index (as shown in step S23 in FIG. 3). In addition, in FIG. 9, when the flow analysis is performed, the grayscale average values of the entire images captured by the detector are different between the frames, and the standard deviation of the grayscale average values can be calculated to obtain fluidity of the reactants. Therefore, the flow of the reactant can be determined by the fluidity monitoring index (as shown in step S17 in FIG. 3). Therefore, in this embodiment, the reaction of each batch of reactants in the manufacturing process can be recorded for a long time by analyzing the generation characteristics of reactants in different phase conditions, so as to establish a monitoring index of the reactants with credibility and verifiability, which can be used as reference data for manufacturing subsequent reactants, and then achieve the purpose of online automated process control.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A system for monitoring and controlling a multi-phase condition of reactants, configured to establish a computer vision image processing and a real-time analysis of the reactants to realize an online automatic control for monitoring and controlling a phase change condition of the reactants in a manufacturing process, the system comprising:

a monitoring device for capturing a plurality of clusters of monitoring images corresponding to a plurality of process reaction time points in a plurality of observation regions;

an image processing module for receiving the clusters of monitoring images, and extracting a plurality of image index features from the clusters of monitoring images;

a phase condition analysis module for determining a plurality of phase modes corresponding to the observation regions according to the image index features;

a feature analysis module for determining a cluster of generation characteristics of the reactants corresponding to the phase modes according to the image index features, including:

determining whether a turbidity of the reactants is lower than a crystal nucleus monitoring index, wherein the crystal nucleus monitoring index corresponds to a light intensity value of a scattered light reflected by the reactants;

determining whether a flow of the reactants is lower than a fluidity monitoring index, wherein the fluidity monitoring index corresponds to a variation value of average grayscale values across a plurality of the monitoring images; and determining whether a solid content of the reactants is higher than a solid content monitoring index, wherein the solid content monitoring index corresponds to a pixel intensity distribution value in a single image of the monitoring images; and a regulation module for performing a regulation of the manufacturing process by utilizing the determined statistical pixel data of the generation characteristics to actively adjust a parameter of the manufacturing process.

2. The system according to claim 1, wherein the monitoring device comprises a plurality of image sensing devices, the image sensing devices respectively correspond to the observation regions and capture real-time images of different areas in the manufacturing process respectively to generate the clusters of monitoring images.

3. The system according to claim 2, wherein the clusters of monitoring images comprises a first monitoring image, a second monitoring image and a third monitoring image corresponding to three observation regions of the observation regions respectively.

4. The system according to claim 3, wherein each of the image index features is one of the light intensity of the scattered light reflected by a small crystal nucleus generated by the reactants, a standard deviation of the average grayscale value of each of the first monitoring image, the second monitoring image and the third monitoring image, and a standard deviation of each of pixel intensities in the single image of the monitoring images.

5. The system according to claim 1, wherein the phase modes are each one of a solid-liquid two-phase and a solid-liquid-gas three-phase.

6. The system of claim 1, wherein the cluster of generation characteristics is one of turbidity, fluidity, solid content and crystal size of the reactants.

7. The system according to claim 1, wherein the regulation module outputs a control logic according to the cluster of generation characteristics of the reactants to adjust parameters of the manufacturing process of the reactants in a reaction tank.

8. The system according to claim 1, wherein the image processing module, the phase analysis module and the feature analysis module establish a training model according to computer vision and machine learning, and analyze the cluster of generation characteristics of the reactants in different phase modes to establish a monitoring index of the reactants.

9. The system according to claim 1, wherein one of the monitoring devices includes an optical detector, at least one light source, and a shielding element, and the shielding element is configured to separate the optical detector and the light source surrounding the optical detector.

\* \* \* \* \*